United States Patent [19]
Henry et al.

[11] 3,715,355
[45] Feb. 6, 1973

[54] N-(MORPHOLINO CARBONYL) 1-LOWER ALKYL-5-NITRO-IMIDAZOLE-2-CARBOXAMIDES

[75] Inventors: David W. Henry, Menlo Park, Calif.; Dale R. Hoff; Arthur A. Patchett, Cranford, both of N.J.

[73] Assignee: Merck & Co., Inc., Rahway, N.J.

[22] Filed: Feb. 12, 1971

[21] Appl. No.: 115,130

Related U.S. Application Data

[62] Division of Ser. No. 800,405, Feb. 19, 1969, Pat. No. 3,632,817.

[52] U.S. Cl. ................................260/247.2 A, 424/248
[51] Int. Cl. ..............................................C07d 87/42
[58] Field of Search................................260/247.2 A Primary Examiner—Alex Mazel
Assistant Examiner—Jose Tovar
Attorney—J. Jerome Behan et al.

[57] ABSTRACT

Nitroimidazolyl ureas and carbamates having antiprotozoal activity prepared by reaction of 1-loweralkyl-5-nitroimidazole-2-carboxamide with oxalyl halide and then with an appropriate alcohol or amine. The product compounds are useful as parasiticides.

3 Claims, No Drawings

N-(MORPHOLINO CARBONYL) 1-LOWER ALKYL-5-NITRO-IMIDAZOLE-2-CARBOXAMIDES

This application is a division of Ser. No. 800,705 filed Feb. 19, 1969, now U.S. Pat. No. 3,632,817.

BACKGROUND OF THE INVENTION

This invention relates generally to new nitroimidazole derivatives, particularly new nitroimidazoloyl urea and carbamate compounds and to a method for their preparation. In its most specific aspects the invention is concerned with novel 1-loweralkyl-5-nitroimidazoloyl ureas and 1-loweralkyl-5-nitroimidazoloyl carbamates, with the chemical synthesis of these new heterocyclic compounds, with compositions containing such compounds and with the use of such compounds and compositions as parasiticides.

Histomoniasis is an extremely destructive poultry disease, the causative organism being the protozoan parasite *Histomonas meleagridis*. This disease, also known as enterohepatitis or turkey blackhead, is a serious economic problem in the turkey-raising industry. The infestation frequently spreads rapidly in turkey flocks and high mortality rates due to the disease are common. The compounds now commercially available for treating enterohepatitis are somewhat beneficial, but none have proven entirely satisfactory because of the development of resistant strains of the causative organism or because undesired side effects are frequently observed at therapeutic dose levels.

The protozoan disease trichomoniasis, caused by *T. vaginalis*, primarily infests the human vagina and is the etiological agent of a very troublesome and prevalent form of vaginal infestation known as *T. vaginalis* vaginitis. Drugs heretofore available for treating this condition, like those used for treating enterohepatitis, have certain limitations and disadvantages.

According to this invention, it has now been found that certain 1loweralkyl-5-nitroimidazoloyl ureas and carbamates are highly effective parasiticides, especially with regard to the organisms causing histomoniasis and trichomoniasis. An important feature of the new compounds of this invention is that the substituent attached to the 2-position of the imidazole moiety of the active compounds is a carbonyl urea or carbonyl carbamate group. The urea and carbamate moieties may be further substituted as will be more fully described hereinafter.

A principal object of the present invention is to provide a new class of chemical compounds which have a high degree of antiprotozoal activity. Another object is to provide new 1-loweralkyl-5-nitroimidazoloyl ureas and carbamates. A further object is to provide a process for the preparation of the novel compounds. Another object is to provide antitrichomonal and antihistomonal compositions containing the novel compounds of this invention as ingredients thereof. Further objects will become apparent from the following description of the invention.

The novel 1-loweralkyl-5-nitroimidazoloyl urea and carbamate compounds of this invention are represented by the structural formula

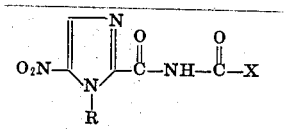

wherein
R represents a loweralkyl group of about 1-5 carbon atoms; and X represents $OR_1$ or $NR_2R_3$ wherein $R_1$ represents a loweralkyl group of about 1-5 carbon atoms, a substituted loweralkyl group, an aryl group, a substituted aryl group or a heteroaryl group, $R_2$ and $R_3$ independently represent hydrogen, a loweralkyl group of about 1-5 carbon atoms, a substituted loweralkyl group, an aryl group or a substituted aryl group and $R_2$ and $R_3$ together with their common nitrogen atom represent a heteroaryl group.

As described above, the term loweralkyl is intended to define an alkyl group having from about 1 to about five carbon atoms, e.g. methyl, ethyl, n-propyl, isopropyl, n-butyl, t-butyl, amyl, isoamyl and the like.

Representative substituents exemplified by $R_1$, above, include lower alkyl, substituted loweralkyl, e.g. hydroxyethyl, aminomethyl, carboxamidoethyl and the like, aryl, e.g. phenyl or naphthyl and the like, substituted aryl, e.g. cyanophenyl, nitrophenyl, xylyl, tolyl, halophenyl such as chlorophenyl or bromophenyl and alkoxyphenyl such as methoxyphenyl or ethoxyphenyl and the like, or heteroaryl, i.e. a five- or six-membered nitrogen-containing heterocyclic group characterized by aromaticity, such as thiazolyl, imidazolyl, pyridyl, pyrimidyl, thienyl and the like.

Substituents exemplified by $R_2$ and $R_3$, above, are hydrogen, lower alkyl of from about one to about five carbon atoms, e.g. methyl, ethyl, amyl and the like, substituted lower alkyl, e.g. hydroxyethyl, haloloweralkyl, e.g. chloroethyl, bromobutyl, cyanoethyl and the like, aryl e.g. phenyl, naphthyl and the like, substituted aryl, e.g. nitrophenyl, cyanophenyl, alkylphenyl, e.g. tolyl, xylyl, halophenyl, e.g. chlorophenyl, bromophenyl, alkoxyphenyl, e.g. methoxyphenyl, butoxyphenyl and the like.

Additionally $R_2$ and $R_3$, together with their common nitrogen atom, represent a heteroaryl group having 5 or 6 members, e.g. thiazolyl, imidazolyl, pyridyl, pyrimidyl, thienyl, morpholinyl, pyrrolidinyl and the like.

Preferably, R is loweralkyl, $R_1$ is methyl or ethyl, $R_2$ and $R_3$ are each hydrogen, methyl, hydroxyethyl, phenyl or p-nitrophenyl and $R_2$ and $R_3$, together with their common nitrogen atom, are morpholino.

In accordance with this invention, one method of preparing the novel nitroimidazoloyl ureas and carbamates described herein is depicted in the following flow diagram.

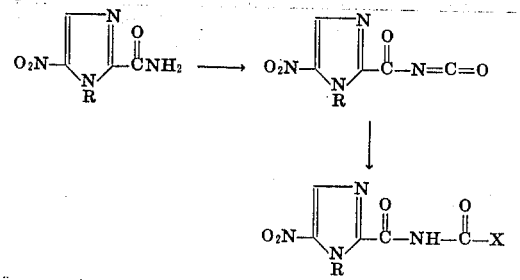

Thus, a 1-loweralkyl-5-nitroimidazole-2-carboxamide is treated with an equivalent or slight excess of phosgene or oxalyl halide, e.g. oxalyl chloride or oxalyl bromide, in ethylene dichloride or other suitable non-reactive solvent, e.g. carbon tetrachloride, chloroform, dichloroethane, toluene and the like. The suspension thus obtained is heated at reflux for between ½ and 4 hours. In this manner, the intermediate two-carbonyl isocyanate illustrated in the flow diagram is formed. To prepare the urea and carbamate derivatives of the present invention, there is added to the reaction mixture containing the 2-carbonyl isocyanate a compound of the formula HX wherein X is defined above. Thus HX will be an alcohol or an amine depending on whether the carbamate or urea derivative is desired.

Particular examples of compounds of the formula HX are ammonia, mono- and dialkylamines, e.g. methylamine, diethylamine, p-aminoethanol, 1-aminopropanol, aniline, p-nitroaniline naphthylamine, morpholine, pyridine, ethanol, ethylene glycol and the like.

The 1-loweralkyl-5-nitroimidazole-2-carboxamides employed as starting materials in the present invention are prepared according to synthetic methods known in the art. One method for preparing these compounds is described in U.S. Pat. No. 3,341,549 whereby a 1-loweralkyl-2-cyano-5-nitroimidazole is contacted with a base, e.g. an aqueous solution of an alkali metal hydroxide.

The 1-loweralkyl-5-nitroimidazoloyl ureas and carbamates of this invention are effective in the control of enterohepatitis in turkeys and in the control of trichomoniasis. In the treatment of enterohepatitis, the compounds are administered to turkeys mixed with an element of turkey sustenance, e.g. feed or drinking water. Good control of the disease is obtained when the compounds of this invention are incorporated in a turkey feed ration at levels of from about 0.001 to about 0.1 percent by weight of the feed and preferably, from about 0.006 to 0.025 percent by weight of the feed. The optimum concentration will depend to a large extent on the age of the birds, the severity of the infection and the particular compound employed. With these feed levels, good control of the disease is obtained with no or minimal growth retardation.

The feed levels at which representative members of the compounds of the invention are active in controlling enterohepatitis in turkeys are as follows:

| Compound | % by Weight in Feed |
|---|---|
| N-(1-methyl-5-nitroimidazole-2-carbonyl) urea | 0.006 |
| N-(N'-morpholinocarbonyl)-1-methyl-5-nitroimidazole carboxamide | 0.025 |
| $N_1$-methyl-$N_2$-(1-methyl-5-nitroimidazole-1-carbonyl)urea | >0.025 |
| $N_1$, $N_1$-dimethyl-$N_2$-(1-methyl-5-nitroimidazole-2-carbonyl) urea | >0.025 |
| $N_1$-phenyl-$N_2$-(1-methyl-5-nitroimidazole-2-carbonyl) urea | >0.025 |
| $N_1$-p-nitrophenyl-$N_2$-(1-methyl-5-nitroimidazole-2-carbonyl) urea | >0.025 |
| $N_1$-($\beta$-hydroxyethyl)-$N_2$-(1-methyl-5-nitroimidazole-2-carbonyl) urea | >0.025 |
| Ethyl-N-(1-methyl-5-nitroimidazole-2-carbonyl) carbamate | >0.025 |

As previously stated, the 1-loweralkyl-5-nitroimidazoloyl ureas and carbamates described herein also have a significant degree of antitrichomonal activity. When employed in treating trichomoniasis, they may be administered orally in unit dosage form, e.g. as tablets or capsules. Such unit dosage forms containing from about 10 to about 100 mg. of active antitrichomonal ingredient are quite satisfactory and are prepared by techniques known to those skilled in the pharmaceutical art. Thus, these unit dosage forms will contain the normal diluents, excipients, lubricating agents and extenders regularly employed in compounding such forms.

Alternatively, the drugs may be suspended or dissolved in liquid vehicles designed for oral administration. The final preparation may be in the form of a solution, emulsion, suspension, syrup or the like and may be adopted for ultimate use by known techniques.

The compounds of this invention are also useful as topical trichomonacides. When employing the compounds in this manner, one or more of the active agents are uniformly distributed in a suitable chemotherapeutic vehicle that is chemically compatible with the particular compound selected, noninhibiting with respect to the action of the effective agent upon T. vaginalis and essentially non-injurious to body tissue under the conditions of use. Oil and water types of emulsions or creams as well as aqueous jellies are suitable vehicles.

Representative compounds which are active in controlling trichomoniasis are set forth below. The activity indicated is that displayed in vivo in mice infested with the trichomonal infection. Activity is expressed in mg./kg. as determined by the method described in Cuckler, Kupferberg and Millman, "Chemotherapeutic and Tolerance Studies on Amino-Nitro Thiazoles," Antibiotics and Chemotherapy, 10, 540–550, 1955.

| Compound | Activity (mg./kg.) |
|---|---|
| N-(1-methyl-5-nitroimidazole-2-carbonyl)urea | 20 |
| $N_1$-methyl-$N_2$-(1-methyl-5-nitroimidazole-2-carbonyl)urea | 40 |
| N-(N'-morpholinocarbonyl)-1-methyl-5-nitroimidazole carboxamide | 40 |
| $N_1$-($\beta$-hydroxyethyl)-$N_2$-(1-methyl-5-nitroimidazole-2-carbonyl) urea | 40 |
| Ethyl-N-(1-methyl-5-nitroimidazole-2-carbonyl) carbamate | 10 |
| $N_1$-phenyl-$N_2$-(1-methyl-5-nitroimidazole-2-carbonyl) urea | >40 |
| $N_1$-p-nitrophenyl-N-(1-methyl-5-nitroimidazole-2-carbonyl) urea | >40 |

Also within the purview of this invention are acid addition salts of the novel compounds described above. The salt may be of an inorganic acid such as the hydrochloride, hydrobromide, phosphate, nitrate or sulfate or of an organic acid examples of which are the citrate, tartrate, adipate, methanesulfonate, p-toluenesulfonate and the like. Non-toxic addition salts, i.e. those tolerated by the host at the dose levels employed, are used when the compounds are to be used in their salt form as antiparasitic agents.

The following examples are given for the purpose of illustration and not by way of limitation.

EXAMPLE 1

N-(1-Methyl-5-Nitroimidazole-2-Carbonyl) Urea

To 10 ml. of dried ethylene dichloride there is added 500 mg. (0.003 mole) of 1-methyl-5-nitroimidazole-2-carboxamide. An amount of 0.3 ml. (0.0036 mole) of oxalyl chloride is added to the suspension. After refluxing for one-half hour, an additional 10 ml. of ethylene dichloride is added to insure complete solution. The solution is then refluxed four hours, concentrated to dryness and the residue is dissolved in 40 ml. of benzene. An excess of ammonia is bubbled into the benzene solution to afford N-(1-methyl-5-nitroimidazole-2-carbonyl) urea as a fine white precipitate, m. p. 190°–195°C.

In the same manner as described above, addition of excess mono- or di-alkylamine affords the corresponding $N_1$-alkyl or $N_1$, $N_1$-dialkyl urea. Thus, excess monomethylamine affords $N_1$-methyl-$N_2$-(1-methyl-5-nitroimidazole-2-carbonyl) urea, m. p. 170°–175°C. and excess dimethylamine affords $N_1$, $N_1$-dimethyl-$N_2$-(1-methyl-5-nitroimidazole-2-carbonyl) urea, m. p. 129°–135°C.

Similarly, addition of excess ethylamine or amylamine affords $N_1$-ethyl-$N_2$-(1-methyl-5-nitroimidazole-2-carbonyl) urea and $N_1$-amyl-$N_2$-(1-methyl-5-nitroimidazole-2-carbonyl) urea, while addition of excess di-n-propylamine or di-n-butylamine affords $N_1$, $N_1$-di-n-propyl-$N_2$-(1-methyl-5-nitroimidazole-2-carbonyl) urea and $N_1$, $N_1$-di-n-butyl-$N_2$-(1-methyl-5-nitroimidazole-2-carbonyl) urea.

By substituting 1-ethyl-5-nitroimidazole-2-carboxamide, 1-propyl-5-nitroimidazole-2-carboxamide, 1-butyl-5-nitroimidazole-2-carboxamide or 1-amyl-5-nitroimidazole 2-carboxamide for 1-methyl-5-nitroimidazole-2-carboxamide, the 1-loweralkyl analogs of the compounds described above are obtained.

EXAMPLE 2

$N_1$-($\beta$-Hydroxyethyl)-$N_2$-(1-Methyl-5-Nitroimidazole-2-Carbonyl Urea

A mixture of 170 mg (0.001 mole) of 1-methyl-5-nitroimidazole-2-carboxamide, 7 ml. of dry ethylene dichloride and 0.1 ml. (0.0012 mole) of oxalylbromide is heated at reflux for one-half hour and the reaction mixture is concentrated to dryness. The dry residue is dissolved in benzene and 0.1 ml. (0.0016 mole) of aminoethanol is added to afford $N_1$-($\beta$-hydroxyethyl)-$N_2$-(1-methyl-5-nitroimidazole-2-carbonyl) urea as a greenish yellow precipitate. After dissolving in alcohol, filtering, washing and drying, the product is obtained as a white, crystalline solid, m.p. 124°–128°C.

Substitution of 1-ethyl-5-nitroimidazole-2-carboxamide or 1-n-propyl-5-nitroimidazole-2-carboxamide in the above process affords $N_1$-($\beta$-hydroxyethyl)-$N_2$-(1-ethyl- 5-nitroimidazole-2-carbonyl) urea and $N_1$-($\beta$-hydroxyethyl)- $N_2$-(1-n-propyl-5-nitroimidazole-2-carbonyl) urea.

Similarly, other $N_1$-hydroxyalkyl derivatives are prepared by addition of the appropriate aminoalcohol, e.g. 1-aminopropanol, 1-aminobutanol, 1-aminopentanol and the like.

Further, $N_1$-haloakyl and $N_1$-cyanoalkyl derivatives are prepared by substituting chloroethanol, cyanopropanol and the like for the above described aminoalcohols.

EXAMPLE 3

$N_1$-Phenyl-$N_2$-(1-Methyl-5-Nitroimidazole-2-Carbonyl) Urea

A mixture of 258 mg. (0.00155 mole) of 1-methyl-5-nitroimidazole-2-carboxamide, 10 ml. of dry ethylene dichloride and 0.16 ml. (0.0019 mole) of oxalyl chloride is heated at reflux for one hour. The solution is concentrated to dryness under reduced pressure and then reconcentrated from a benzene solution. The dry residue is dissolved in 50 ml. of benzene and 0.2 ml. (0.0022 mole) of aniline is added. There is an immediate separation of solids which are concentrated, filtered and dried to afford $N_1$-phenyl-$N_2$-(1-methyl-5-nitroimidazole-2-carbonyl) urea, m. p. 237°–238°C.

In the same manner as described above, substitution of p-nitroaniline for aniline affords $N_1$-p-nitrophenyl-$N_2$-(1-methyl-5-nitroimidazole-2-carbonyl) urea, m. p. 239°–240°C.

Similarly, other $N_1$-substituted phenyl compounds are prepared by reacting p-cyanoaniline, p-methylaniline, p-chloroaniline, p-methoxyaniline and the like in lieu of aniline.

Also, substitution of naphthylamine for aniline in the above process affords $N_1$-naphthyl-$N_2$-(1-methyl-5-nitroimidazole-2-carbonyl) urea.

EXAMPLE 4

N-(N'-Morpholinocarbonyl)-1-Methyl-5-Nitroimidazole-2-Carboxamide.

A mixture of 250 mg. (0.0015 mole) of 1-methyl-5-nitroimidazole-2-carboxamide, 10 ml. of dry ethylene dichloride and 0.15 ml. (0.0018 mole) of oxalyl chloride is refluxed for four hours and allowed to stand overnight at room temperature. The solution is concentrated to dryness at reduced pressure and then reconcentrated from benzene. The dry residue is dissolved in 20 ml. of benzene and 0.34 ml. of morpholine is added resulting in a slow separation of solids. The solids are filtered, washed and dried to afford N-(N'-morpholinocarbonyl)-1-methyl-5-nitroimidazole-2-carboxamide as a white, crystalline solid, m. p. 143°–145°C.

Similarly, other N'-heteroarylcarbonyl compounds are prepared by substituting thiazole, imidazole, pyridine, pyrimidine, thiophene, or pyrrolidine for morpholine in the above procedure.

EXAMPLE 5

Ethyl N-(1-Methyl-5-Nitroimidazole-2-Carbonyl) Carbamate

A mixture of 250 mg. (0.0015 mole) 1-ethyl-5-nitroimidazole-2-carboxamide, 10 ml. of dry ethylene dichloride and 0.16 ml. of oxalyl chloride is heated at reflux for one hour. After concentrating the solution to dryness under reduced pressure and reconcentrating from a benzene solution, the residue is dissolved in 5 ml. of ethanol and chilled affording ethyl-N-(1-methyl-5-nitroimidazole-2-carbonyl) carbamate, m. p. 127.5°–130°C.

Other carbamate derivatives are prepared in the manner described above by replacing ethanol with propanol, butanol, ethylene glycol, aminopropanol, carboxamidoethanol, phenol, naphthol, p-cyanophenol, p-nitrophenol, p-chlorophenol and the like.

PREPARATION 1

1-Methyl-5-Nitroimidazole-2-Carbonyl Isocyanate

To 10 ml. of dried ethylene dichloride there is added 500 mg. (0.003 mole) of 1-methyl-5-nitroimidazole-2-carboxamide. An amount of 0.3 ml. (0.0036 mole) of oxalyl chloride is added to the suspension. After refluxing for one-half hour, an additional 10 ml. of ethylene dichloride is added. The solution is then refluxed four hours and the solvent is evaporated at reduced pressure to afford 1-methyl-5-nitroimidazole-2-carbonyl isocyanate as a residue.

Similarly, other 1-loweralkyl-5-nitroimidazole-2-carbonyl isocyanates are prepared by replacing 1-methyl-5-nitroimidazole-2-carboxamide in the above procedure with other 1-loweralkyl-5-nitroimidazole-2-carboxamides.

Obviously, many modifications and variations of the present invention are possible in the light of the above teachings. It is therefore to be understood that, within the scope of the appended claims, the invention may be practiced otherwise than as specifically described.

What is claimed is:

1. The compound

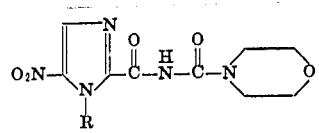

wherein R is loweralkyl having 1–5 carbon atoms.

2. The compound of claim 1 wherein R is methyl or ethyl.

3. The compound of claim 2 which is N-(morpholinocarbonyl)-1-methyl-5-nitroimidazole-carboxamide.

* * * * *